(12) United States Patent
Corsini

(10) Patent No.: US 9,955,060 B2
(45) Date of Patent: Apr. 24, 2018

(54) SYSTEM AND METHOD TO CONTROL THE ORIENTATION OF A MOBILE VIDEO CAMERA TO FILM ATHLETES MOVING ON A FIELD OF PLAY

(71) Applicant: 01Wiring S.R.L., Sasso Marconi (IT)

(72) Inventor: Ivano Corsini, Sasso Marconi (IT)

(73) Assignee: 01WIRING S.R.L., Sasso Marconi (IT)

( * ) Notice: Subject to any disclaimer, the term of this patent is extended or adjusted under 35 U.S.C. 154(b) by 257 days.

(21) Appl. No.: 14/908,697

(22) PCT Filed: Aug. 1, 2014

(86) PCT No.: PCT/IB2014/063631
§ 371 (c)(1),
(2) Date: Jan. 29, 2016

(87) PCT Pub. No.: WO2015/015469
PCT Pub. Date: Feb. 5, 2015

(65) Prior Publication Data
US 2016/0173753 A1      Jun. 16, 2016

(30) Foreign Application Priority Data
Aug. 1, 2013   (IT) .............................. BO2013A0431

(51) Int. Cl.
*H04N 5/232* (2006.01)
*H04N 7/18* (2006.01)
*G06K 7/10* (2006.01)
*G08B 13/181* (2006.01)

(52) U.S. Cl.
CPC ...... *H04N 5/23203* (2013.01); *G06K 7/10306* (2013.01); *G08B 13/181* (2013.01); *H04N 5/23296* (2013.01)

(58) Field of Classification Search
CPC ............ A63F 13/837; A63F 2300/6661; A63F 2300/6676; A63F 13/573; A63B 2024/0025; A63B 2220/836; A63B 2225/54; A63B 24/0021; H04N 5/23203; H04N 5/23296; H04N 3/155
See application file for complete search history.

(56) References Cited

U.S. PATENT DOCUMENTS 5,513,854 A * 5/1996 Daver ................ A63B 24/0003
                                                    348/157
6,710,713 B1 * 3/2004 Russo ................ A63B 24/0021
                                                    340/573.1

(Continued)

*Primary Examiner* — Nathnael Aynalem
(74) *Attorney, Agent, or Firm* — Dorsey & Whitney LLP

(57) ABSTRACT

System and Method to adjust the orientation of a mobile video camera suited to film a pair of athletes moving on a field of play, wherein the position of the athletes is determined relative to a coordinate system integral to the field of play by using radio transmitters, which are applied to the bodies of the athletes, and radio receivers arranged around the field of play, and fixed relative to the field of play and interfaced with a processing and control unit, the processing and control unit determines an intermediate position between the two athletes as a function of the current positions of two athletes, and a motor-driven moving device moves the mobile video camera so as to center the respective camera framing on the intermediate position.

15 Claims, 3 Drawing Sheets

(56) References Cited

U.S. PATENT DOCUMENTS

| | | | |
|---|---|---|---|
| 2005/0202905 A1* | 9/2005 | Chesser | A63B 24/0021 473/415 |
| 2008/0297304 A1* | 12/2008 | Moscovitch | H04N 7/181 340/3.1 |
| 2011/0205022 A1* | 8/2011 | Cavallaro | A63B 24/0021 340/8.1 |
| 2012/0081531 A1* | 4/2012 | DeAngelis | A63B 24/0021 348/77 |

* cited by examiner

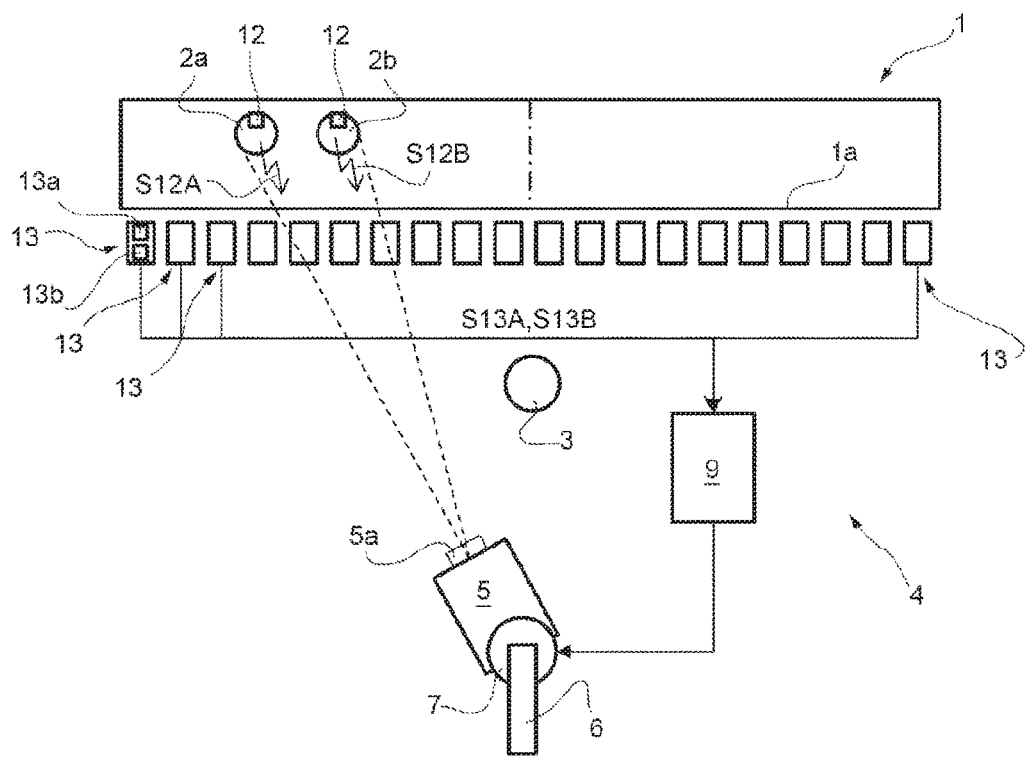
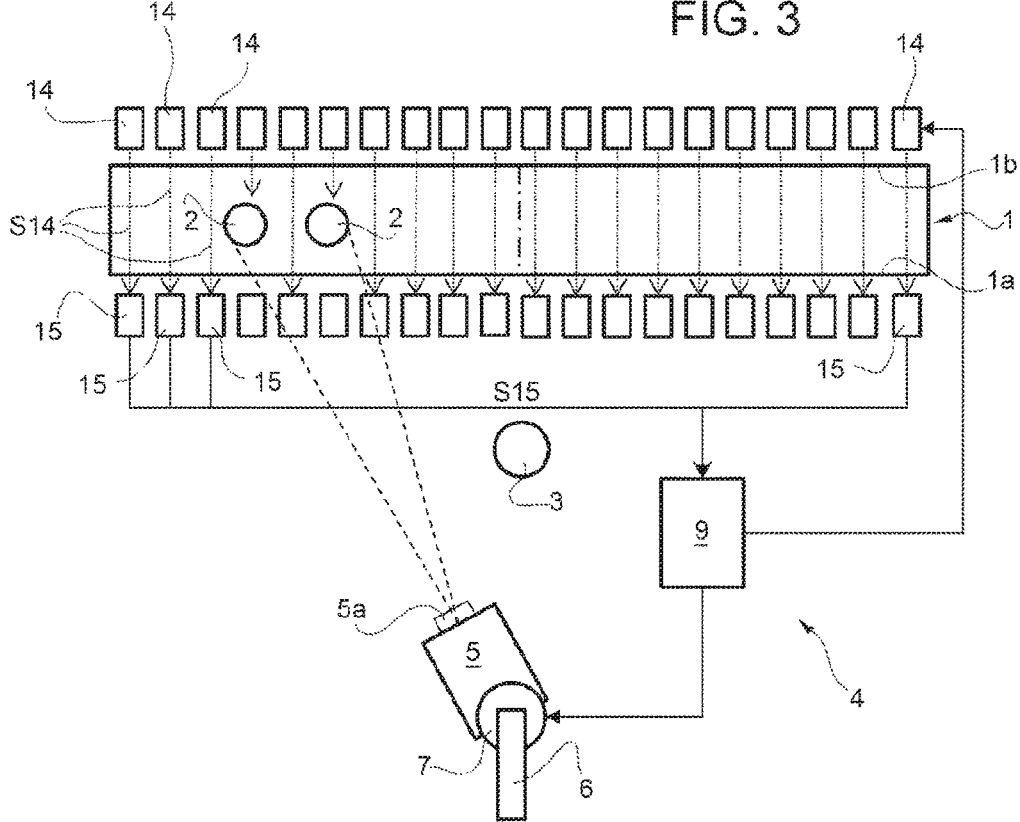

SYSTEM AND METHOD TO CONTROL THE ORIENTATION OF A MOBILE VIDEO CAMERA TO FILM ATHLETES MOVING ON A FIELD OF PLAY

TECHNICAL FIELD

The present invention generally relates to a method for controlling the orientation of a mobile video camera suited to film a pair of athletes moving on a field of play and to a corresponding system for filming moving athletes. In particular, the present invention allows for advantageous, but not exclusive, application in the one-dimensional field of play, for example the fencing platform, to which the following description will make explicit reference without thereby losing generality.

BACKGROUND OF THE INVENTION

In fencing competitions, the decision of which fencer is to be assigned a point at the end of an action is taken by a referee who normally stands aside, and at one-half length from the fencing platform. Behind the referee a video camera is normally positioned for filming the pair of fencers moving on the field of play. The video camera lens is arranged at a height greater than that of the referee for preventing the latter from obstructing the view of the fencers. The video images recorded by the video camera can help the referee in making a decision on the point to be assigned at the end of a very rapid exchange of strikes between the fencers. To this end, the video camera framing must remain constantly focused and narrowed upon the pair of fencers as they move along the competition platform. For this reason, the video camera is mounted on a mobile support which allows to adjust the orientation of the video camera relative to the competition platform while a person moves the support to keep the framing centered on the pair of fencers as they move along the competition platform. Therefore, if an exchange of strikes proves to have been too quick even for the referee, then the latter may decide who receives the point only after having looked at the recorded video images in slow motion.

As can be understood, the filming method described above is strongly subject to the inattentiveness of the person moving the video camera. In other words, it is not uncommon for the person operating the video camera to be unable to maintain an accurate framing thus missing out one of the fencers, when, during an exchange of strikes, they quickly reach one end of the platform. In these cases, the recorded video images cannot be of any help to the referee.

SUMMARY OF THE INVENTION

A purpose of the present invention is to provide a method for adjusting the orientation of the video camera in automatic mode for maintaining the framing centered on the pair of fencers moving on the competition platform, and a corresponding system for filming the pair of moving fencers, which method and system are free from the drawbacks described above and, at the same time, easy and inexpensive to manufacture.

In accordance with the present invention, a method for adjusting the orientation of a first mobile video camera suited to film a pair of athletes moving on a field of play, and a system to film a pair of athletes moving on a field of play, as defined in the attached claims are provided.

BRIEF DESCRIPTION OF THE DRAWINGS

The present invention will now be described with reference to the accompanying Drawings, which illustrate non-limiting embodiments applicable, purely by way of example, to the substantially one-dimensional fencing field of play, wherein:

FIGS. 2 to 4 illustrate the system for filming a pair of athletes moving on a field of play, according to three respective further embodiments of the invention.

DETAILED DESCRIPTION OF THE PRESENT INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

Figure 1:
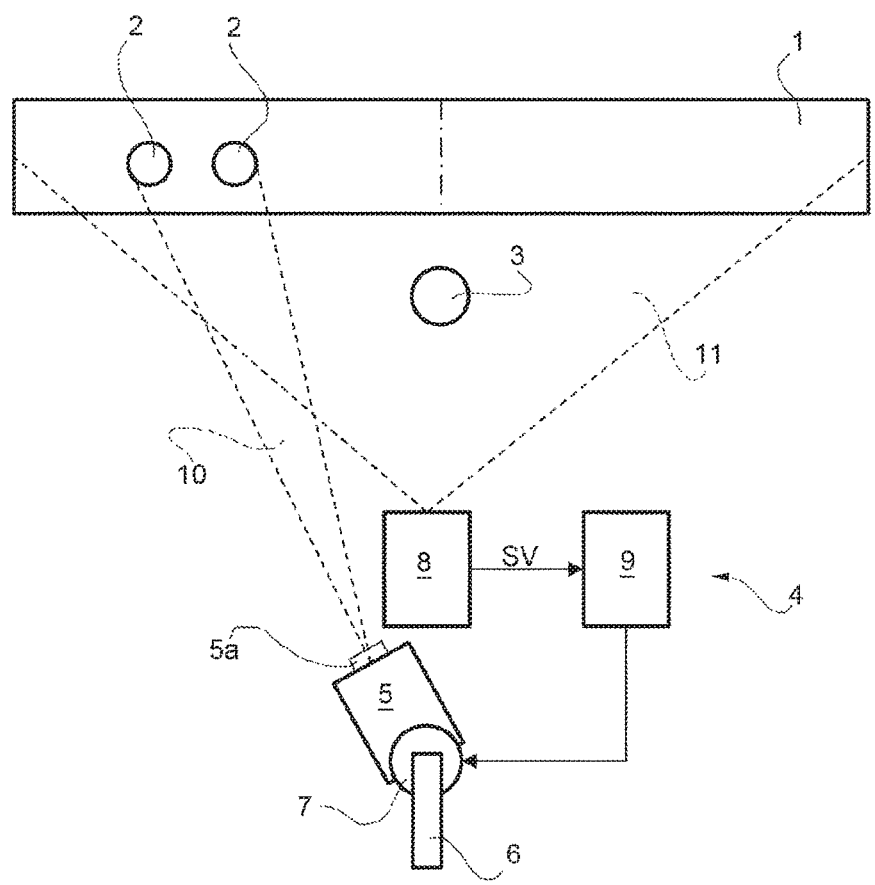
FIG. 1 shows, in a schematic way, a system for filming a pair of athletes moving on a field of play, according to a first embodiment of the invention.

In FIG. 1, reference numeral 1 denotes a fencing platform, 2 denotes the two fencers that compete on the platform 1, 3 indicates the referee who is standing aside, and at the mid-length, of the platform 1 for watching the same 1 and 4 denotes a system for filming the fencers 2 moving on the platform 1. The system 4 comprises a video camera 5 for filming the pair of athletes moving on the platform 1 and a support 6 for supporting the video camera 5 with its own lens 5a facing towards the platform 1 and at a height greater than that of the referee 3. As shown in FIG. 1, the video camera 5 is normally arranged behind the referee 3 relative to the position of the platform 1.

With reference again to FIG. 1, according to the present invention, the system 4 comprises a motor-driven moving device 7, which is mounted on the support 6 and on which the video camera 5 is mounted to move the latter by changing its orientation relative to the platform 1, a further video camera 8, which is arranged fixed relative to the platform 1 for framing the whole platform 1 in order to acquire video images indicating the position of the fencers 2 moving on the platform 1, and a processing and control unit 9, which is interfaced with the video camera 8 to receive, from the latter, the video images in the form of a SV video signal, and is configured to determine, in real time, as a function of the SV video signal, an intermediate position between the two fencers 2 relative to a coordinate system integral with the platform 1 and to control the moving device 7 so as to center the framing of the video camera 5 on the intermediate position. As can be seen from FIG. 1, the framing 11 of the video camera 8 should be much wider than the framing 10 of the video camera 5.

The motorization device 7 is constituted by an electric motor provided with a respective encoder enabling high accuracy control of the angular position of the electric motor. The video camera 5 is mounted integral with the motor shaft of the electric motor of the moving device 7 to rotate together with the motor shaft of the electric motor. The motorization device 7 is known per se and is not described with further detail.

The processing and control unit 9 is configured for processing the video images provided by the video camera 8 to identify the moving fencer silhouettes, process each silhouette in order to determine the position of the respective fencer 2 relative to said coordinate system and determine the intermediate position between the two fencers as a function of the current positions of the two fencers. In detail, each silhouette is processed to determine, as the position of the respective fencer, the position of a certain point of the fencer's body, for example, the waist of the fencer's body, in the area of the framing 11.

According to a further embodiment of the present invention illustrated in FIG. 2, wherein the fencers are indicated with 2a and 2b and the corresponding elements are indicated with the same numbers and abbreviations of FIG. 1, the system 4 comprises, instead of the video camera 8 of FIG. 1, two radio transmitters 12, each of which is associated with a respective fencer 2a, 2b and which are applied in similar points of the body of the two fencers 2a and 2b, and a plurality of radio receivers 13, which are arranged in fixed and known positions along the platform 1 and defined relative to the coordinate system integral with the platform 1 and are interfaced with the processing and control unit 9 to communicate to the latter, in analog form, the signals received. Each transmitter 12 is, for example, fixed on the helmet of the respective fencer 2a, 2b and is of the battery-powered type. The radio receivers 13 are arranged in series and equally spaced apart along a first longer side 1a of the platform 1. Since the radio receivers 13 are distributed along the longer side 1a, the coordinate system integral with the platform 1 is a one-dimensional coordinate system which has as an origin a point of the longer side 1a, for example an end point or the middle point of the longer side 1a.

The radio transmitters 12, once turned on at the beginning of the competition, transmit two respective radio signals, indicated with S12A and S12B in FIG. 2, having two different frequencies that are selected in the frequency range between 400 MHz and 2.5 GHz. Specifically, the two frequencies of the two radio signals S12A and S12B are comprised in at least one frequency band for unlicensed radio communication, for example one of the ISM bands, the LPD433 band and/or the PMR446 band. Each radio receiver 13 comprises a pair of band-pass filters 13a and 13b tuned separately on the two frequencies for simultaneously receiving the two radio signals S12A and S12B, according to known techniques of frequency division multiplexing, and to provide two electrical signals S13A and S13B corresponding to the radio signals received.

The embodiment of FIG. 2 differs from that of FIG. 1 also in that the processing and control unit 9 is configured to determine the position of the moving fencers 2a and 2b as a function of the known positions of the radio receivers 13 and of radio signals received by the radio receivers 13.

In particular, the processing and control unit 9 is configured to receive the signals S13A and S13B from each radio receiver 13, to measure, for each of the different frequencies of radio signals S12A and S12B, the intensity and/or the phase of the radio signals received and determine the position of each fencer 2a, 2b along the platform 1 as a function of the intensity and/or of the phases measured for the respective frequency and as a function of the known positions of the radio receivers 13. More in detail, the signals S13A are processed to measure the intensity and/or the phases of the received signals at the frequency of the signal S12A in order to determine the position of the fencer 2a while the other signals S13B are processed to measure the intensity and/or the phases of the signals received at the signal frequency S12B in order to determine the position of the fencer 2b. Therefore all the signals S13A and S13B are, in their entirety, indicative of the position of the fencers 2a and 2b.

By intensity of received radio signal, in this document, is meant the received power measured in dBm. For example, the position of each fencer 2a, 2b can be determined as an average value of the positions of said two or more radio receivers 13 whose received signals at the frequency associated with said fencer 2a, 2b have the higher intensity measured values.

According to a further embodiment of the invention, not illustrated and substantially derived from that illustrated by FIG. 2, each radio receiver 13 is suitable to tune-in alternately, in time division, according to known techniques of time division multiplexing, on the two frequencies of the radio signals S12A and S12B.

According to a further embodiment of the present invention illustrated in FIG. 3, wherein the fencers are again both indicated with 2 and the corresponding elements are indicated with the same numbers and abbreviations of FIG. 2, the system 4 comprises, instead of the radio transmitters 12 and of the radio receivers 13 of FIG. 2, a plurality of optical transmitters 14, which are arranged in known positions and fixed along the platform 1 and defined relative to the coordinate system integral with the platform 1 and at a predetermined height H from the ground to transmit respective optical radiation beams S14, and a corresponding plurality of optical receivers 15, which are arranged on the opposite side of the platform 1, so that each optical receiver 15 is facing a respective optical transmitter 14 to receive the respective optical radiation beam S14 and detect the possible interception. The height H is approximately between 0.5 and 1 m.

The optical transmitters 14 are arranged in series and equally spaced apart along a longer side 1b of the platform 1. The optical transmitters 14 are turned on by the processing and control unit 9. The optical transmitters 14 are arranged to emit laser beams of infrared radiation. The optical receivers 15 are arranged in series and equally spaced apart along the other longer side 1a of the platform 1. The optical receivers 15 are suited to detect which optical radiation beams S14 are intercepted by the fencers 2 moving on the platform 1. Therefore, the optical receivers 15 provide the processing and control unit 9 with electrical signals S15 of on/off type that are indicative of the possible interception of the corresponding optical radiation beam S14, and which therefore, once combined with the position information of the respective optical receivers 15 along the platform 1, are indicative of the position of the fencers 2.

The embodiment of FIG. 3 differs from that of FIG. 2, also in that the processing and control unit 9 is configured to determine the position of the moving fencers 2 as a function of the signals S15 and of the position of the optical receivers 15, i.e., in other words, the position of said optical receivers 15 which detect the interception of the corresponding optical radiation beam S14.

Figure 4:
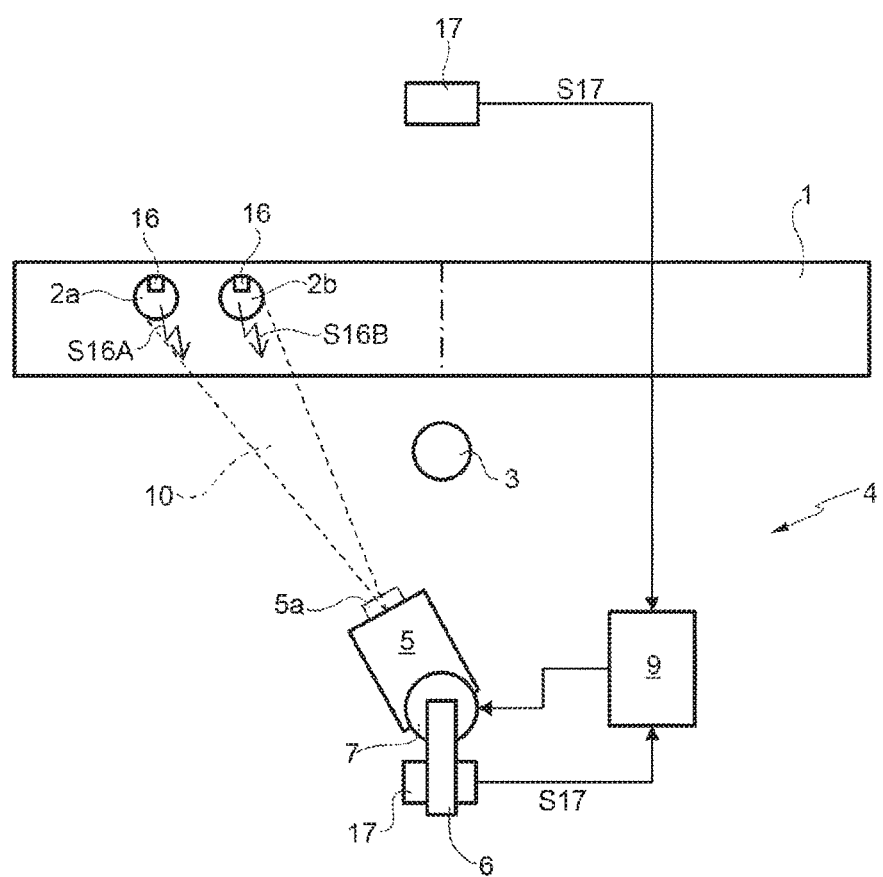

FIG. 4 illustrates a further embodiment of the present invention which is essentially an evolution of the embodiment of FIG. 2.

With reference again to FIG. 4, the system 4 comprises, instead of the two radio transmitters 12, two respective active RFID tags 16, which are applied to the bodies of the respective fencers 2a and 2b in the same way as the radio transmitters 12 and are suited to transmit respective UWB (Ultra Wide Band) radio signals, indicated with S16A and A16B in FIG. 4, and, in place of the radio receivers 13, two receiver devices 17, which are arranged in two respective positions around the platform 1 and each comprises a respective antenna array and a respective plurality of UWB receivers to receive both signals S16A and S16B.

In the example of FIG. 4 the two receiver devices 17 are arranged facing one another from opposite sides of the platform 1, at the mid-length of the same. In particular, one of the two receiver devices 17 is fixed to the support 6. According to an alternative not illustrated, the two receiver devices 17 are arranged on the side of a same long side of the platform 1 and are preferably aligned parallel to the platform 1.

The frequency band used by the signals S16A and S16B is a non-licensed type and is allocated on frequencies higher than 3 GHz. For example, the bandwidth of the signals S16A and S16B is allocated in the frequency range between 3 GHz and 11 GHz.

The processing and control unit 9 is interfaced with the receiver devices 17 to acquire from the latter data and/or electrical signals S17 indicative of the signals S16A and S16B received and is configured to determine the position of the moving fencers 2a and 2b as a function of the signals provided by the receiver devices 17. In particular, the position of each fencer 2a and 2b is determined by a multi-lateration algorithm based on the calculation of the "Time Difference Of Arrival" (TDOA) of the signals received from two receiver devices 17 for each of the transmitted signals S16A and A16B.

According to further embodiments not illustrated of the present invention, the system 4 comprises more than two receiver devices 17 arranged at respective points around the platform 1. A greater number of receiver devices 17 allows to improve the accuracy with which the multi-lateration algorithm determines the positions of the fencers 2a and 2.

It is worth noting that the methodology implemented by the system 4 described above is suited to film any pair of athletes in any sport as they move on a respective field of play. In the most generic case, the field of play is not one-dimensional, as the platform 1, but is two-dimensional, as for example a football field.

The embodiment wherein the means for detecting the position of the athletes comprise radio transmitters and receivers is well suitable for use in two-dimensional fields of play within which more than two athletes to be filmed are moving, however, in pairs, for example for following and filming a defender intent to thwart an attacker during a football game. In this case, the system 4 comprises a number of radio transmitters equal to the number of athletes in the field of play to transmit respective radio signals having different frequencies from one another, and a plurality of radio receivers arranged along at least one portion of the perimeter of the field of play, for example, a shorter side and a longer side of a football field. The pair of athletes to be filmed is easily selectable by selecting the two frequencies on which each radio receiver must tune-in, by frequency division or by time division. In the case of use of the frequency division technique, each radio receiver comprises a number of band-pass filters equal to the number of frequencies transmitted by radio transmitters.

The embodiment wherein the means for detecting the position of the athletes comprise optical transmitters and receivers is well suitable for use in two-dimensional fields of play in which only two athletes move, for example to closely follow and film two karate fighters competing on a rectangular fighting platform. In this case, the system 4 comprises a plurality of optical transmitters arranged along a portion of the perimeter of the fighting platform, for example on two orthogonal sides of the platform, and a corresponding plurality of optical receivers arranged along an opposite portion of the perimeter of the fighting platform, for example, the two opposite orthogonal sides of the platform.

While the systems and methods described herein have been shown and described with reference to the illustrated embodiments, those of ordinary skill in the art will recognize or be able to ascertain many equivalents to the embodiments described herein by using no more than routine experimentation. Such equivalents are encompassed by the scope of the present disclosure and the appended claims.

Accordingly, the systems and methods described herein are not to be limited to the embodiments described herein, can include practices other than those described, and are to be interpreted as broadly as allowed under prevailing law.

The invention claimed is:

1. A method to adjust mobile video camera orientation to film two or more athletes moving on a field of play, comprising:
   determining a position of at least two moving athletes relative to a coordinate system integral to a field of play by using a plurality of radio transmitters, each said radio transmitter being attached to respective bodies of said at least two athletes, and a radio receiver, said radio receiver being arranged around at least part of said field of play and fixed relative to the coordinate system and configured to receive radio signals from the plurality of radio transmitters;
   interfacing the position of said at least two moving athletes to a processor connected with the radio receiver determining, in real time, using said processor, an intermediate position between said at least two moving athletes relative to said coordinate system, as a function of the current positions of said at least two athletes; and moving, using a motor-driven mover controlled by said processor, the mobile video camera to center a respective camera framing on said intermediate position.

2. The method according to claim 1, wherein said plurality of radio transmitters comprises at least two radio transmitters, each of which is attached to the body of a respective athlete, and said radio receiver comprises a plurality of radio receivers, which are arranged in predetermined positions along at least one portion of a perimeter of said field of play.

3. The method according to claim 2, wherein said determining the position of the at least two moving athletes comprises:
   transmitting, using said at least two radio transmitters, at least two respective radio signals having at least two different frequencies;
   receiving, by said plurality of radio receivers, said at least two radio signals; measuring, using said processor, the intensity and/or the phase of said at least two radio signals received by said plurality of radio receivers for each of said two frequencies; and
   determining, using said processor, the position of each of said at least two moving athletes on the field of play as a function of the measured intensity and/or phases of the signals received at respective frequencies and positions of said at least two radio receivers.

4. The method according to claim 1, wherein said plurality of radio transmitters comprises at least two Ultra Wide Band (UWB) Radio Frequency Identification (RFID) tags, respective tags being attached to the bodies of respective athletes, and wherein said radio receiver comprises at least two receiver devices, each of which comprises a respective antenna array and a respective plurality of UWB receivers.

5. The method according to claim 4, wherein said determining the position of said at least two moving athletes comprises:
transmitting, using respective at least two RFID tags, at least two respective UWB radio signals;
receiving, using said at least two receiver devices, said at least two respective UWB radio signals; and
determining, using said processor, the position of each of said at least two moving athletes on said field of play, as a function of the signals received by said at least two receiver devices for said at least two UWB radio signals transmitted.

6. The method according to claim 5, wherein the position of each of said at least two moving athletes is determined by a multi-lateration algorithm based on a calculation of a time difference of arrival of the received signals by said at least two receiver devices for each of the respective UWB radio signals transmitted.

7. The method according to claim 4, wherein said at least two receiver devices are arranged facing one another on opposite sides of said field of play.

8. A system for filming at least two moving athletes, said system comprising:
a mobile video camera to film at least two moving athletes on a field of play; a motor-driven mover to move said mobile video camera by changing the orientation of the video camera relative to said field of play;
a position detector, said position detector providing signals indicating positions of said at least two moving athletes using a plurality of respective radio transmitters attached to respective bodies of said at least two athletes, and a radio receiver, said radio receiver being arranged in a fixed manner around said field of play and configured to receive radio signals from said plurality of radio transmitters; and
a processor connected to the radio receiver said processor being interfaced with said radio receiver, and configured to determine, in real time, as a function of signals from said radio receiver, an intermediate position between said at least two athletes relative to a coordinate system that corresponds to said field of play, said processor controlling said motor-driven mover so as to center camera framing of said mobile video camera on said intermediate position.

9. The system according to claim 8, wherein said radio transmitter comprises at least two said radio transmitters, respective radio transmitters being attached to respective bodies of said at least two athletes, each said radio transmitter capable of transmitting a respective radio signal at a respective frequency.

10. The system according to claim 8, wherein said radio receiver comprises a plurality of radio receivers, each arranged along at least one portion of a perimeter of said field of play, and capable of receiving said radio signals.

11. The system according to claim 10, wherein said plurality of radio receivers are arranged in series and substantially equally spaced apart along said at least one portion of a perimeter of said field of play.

12. The system according to claim 8, wherein said radio transmitter comprises at least two Ultra Wide Band (UWB) Radio Frequency Identification (RFID) tags, respective tags being attached to the bodies of respective athletes, and each tag being suited to transmit a respective UWB radio signal, wherein said radio receiver comprises at least two radio receivers, each said radio receiver comprising a respective antenna array and a respective plurality of UWB receivers for receiving said UWB radio signals, and wherein said processor is configured for determining said intermediate position as a function of the signals received by the respective radio receivers.

13. The system according to claim 12, wherein said processor is configured for determining the position of each of said at least two athletes by a multi-lateration algorithm based on the calculation of a time difference of arrival of the received signals at said at least two radio receivers for each of said UWB radio signals transmitted.

14. The system according to claim 12, wherein said processor determines said intermediate position as a function of the position of said at least two athletes.

15. The system according to claim 12, wherein said two radio receivers are arranged facing each other from opposite sides of said field of play.

* * * * *